US012712844B2

(12) United States Patent
Liu et al.

(10) Patent No.: US 12,712,844 B2
(45) **Date of Patent: *Aug. 18, 2026**

(54) DYNAMIC NETWORK ADDRESS MANAGEMENT

(71) Applicant: VMware LLC, Palo Alto, CA (US)

(72) Inventors: Xiaopei Liu, Beijing (CN); Jianjun Shen, Redwood City, CA (US); Donghai Han, Beijing (CN); Wenfeng Liu, Beijing (CN); Danting Liu, Beijing (CN)

(73) Assignee: VMware LLC, Palo Alto, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 18/893,692

(22) Filed: Sep. 23, 2024

(65) Prior Publication Data

US 2025/0126095 A1 Apr. 17, 2025

Related U.S. Application Data

(63) Continuation of application No. 17/820,351, filed on Aug. 17, 2022, now Pat. No. 12,101,292.

(30) Foreign Application Priority Data

Jul. 15, 2022 (WO) ................ PCT/CN2022/105928

(51) Int. Cl.
*H04L 61/5061* (2022.01)

(52) U.S. Cl.
CPC ................................ *H04L 61/5061* (2022.05)

(58) Field of Classification Search
None
See application file for complete search history.

(56) References Cited

U.S. PATENT DOCUMENTS

| | | | | |
|---|---|---|---|---|
| 10,693,715 | B1 * | 6/2020 | Strauss | H04L 61/255 |
| 11,316,822 | B1 * | 4/2022 | Gawade | G06F 11/2025 |
| 11,757,833 | B2 * | 9/2023 | Raison | H04L 61/5061 709/245 |
| 12,101,292 | B2 | 9/2024 | Liu et al. | |
| 2017/0171144 | A1 | 6/2017 | Sagiraju et al. | |

(Continued)

OTHER PUBLICATIONS

U.S. Appl. No. 17/820,351 Non-Provisional Application filed Aug. 17, 2022, 35 pages.

(Continued)

*Primary Examiner* — Mohamed Ibrahim
(74) *Attorney, Agent, or Firm* — King Intellectual Asset Management

(57) ABSTRACT

A method for network address management is provided. Embodiments include determining a creation of a namespace associated with a cluster of computing devices, wherein a subset of computing resources of the cluster of computing devices is allocated to the namespace. Embodiments include assigning, to the namespace, a network address pool comprising a plurality of network addresses in a subnet, wherein the assigning causes the plurality of network addresses to be reserved exclusively for the namespace. Embodiments include receiving an indication that a pod is added to the namespace. Embodiments include, in response to the receiving of the indication, assigning a network address from the network address pool to the pod.

20 Claims, 5 Drawing Sheets

(56) References Cited

U.S. PATENT DOCUMENTS

| | | | | |
|---|---|---|---|---|
| 2017/0195282 | A1 | 7/2017 | Teng | |
| 2019/0052598 | A1* | 2/2019 | Hira | H04L 61/5007 |
| 2019/0238500 | A1 | 8/2019 | Xu et al. | |
| 2019/0379590 | A1* | 12/2019 | Rimar | G06F 16/9024 |
| 2021/0311760 | A1 | 10/2021 | Oki et al. | |
| 2021/0328858 | A1* | 10/2021 | Asveren | H04L 61/5007 |
| 2022/0006778 | A1 | 1/2022 | Andersson et al. | |
| 2023/0179573 | A1* | 6/2023 | Sosnovich | H04L 63/20 726/1 |
| 2023/0185944 | A1* | 6/2023 | Nair | G06F 21/6218 707/785 |

OTHER PUBLICATIONS

U.S. Appl. No. 17/820,351, Non-Final Office Action dated Jun. 23, 2023, 23 pages.
U.S. Appl. No. 17/820,351, Final Office Action dated Dec. 7, 2023, 34 pages.

* cited by examiner

Data Center 150

Controller 136

Manager 160

126

Gateway 134

Network 110

Host(s) 105

VCI $135_1$

VCI $135_2$

...

VCI $135_n$

Hypervisor 116

Hardware Platform 106

132

Namespace 210

Remove 310

VCI $135_1$

VCI $135_2$

Configuration Information 232

*Subnet Prefix: 16*

Network Address Pool 242

*Subnet: 172.10.0.0/16*

Delete 320

Namespace 220

VCI $135_3$

VCI $135_4$

...

VCI $135_n$

Configuration Information 234

*Subnet Prefix: 24*

Network Address Pool 244

*Subnet: 172.10.120.0/24*

Release 330

Network Address Pool 246

*Subnet: 172.10.130.0/24*

402

RECEIVE CONFIGURATION INFORMATION COMPRISING A CONFIGURED SUBNET PREFIX FOR A NAMESPACE ASSOCIATED WITH A CLUSTER OF COMPUTING DEVICES, WHEREIN A SUBSET OF COMPUTING RESOURCES OF THE CLUSTER OF COMPUTING DEVICES IS ALLOCATED TO THE NAMESPACE

404

ASSIGN A FIRST NETWORK ADDRESS POOL TO THE NAMESPACE, WHEREIN THE FIRST NETWORK ADDRESS POOL COMPRISES A FIRST PLURALITY OF NETWORK ADDRESSES IN A FIRST SUBNET CORRESPONDING TO THE CONFIGURED SUBNET PREFIX

406

DETERMINE THAT AN ADDITION OF A POD TO THE NAMESPACE CAUSES A NUMBER OF PODS IN THE NAMESPACE TO EXCEED A NUMBER OF AVAILABLE NETWORK ADDRESSES IN THE FIRST NETWORK ADDRESS POOL

408

ASSIGN A SECOND NETWORK ADDRESS POOL TO THE NAMESPACE BASED ON THE ADDITION OF THE POD TO THE NAMESPACE, WHEREIN THE SECOND NETWORK ADDRESS POOL COMPRISES A SECOND PLURALITY OF NETWORK ADDRESSES IN A SECOND SUBNET CORRESPONDING TO THE CONFIGURED SUBNET PREFIX

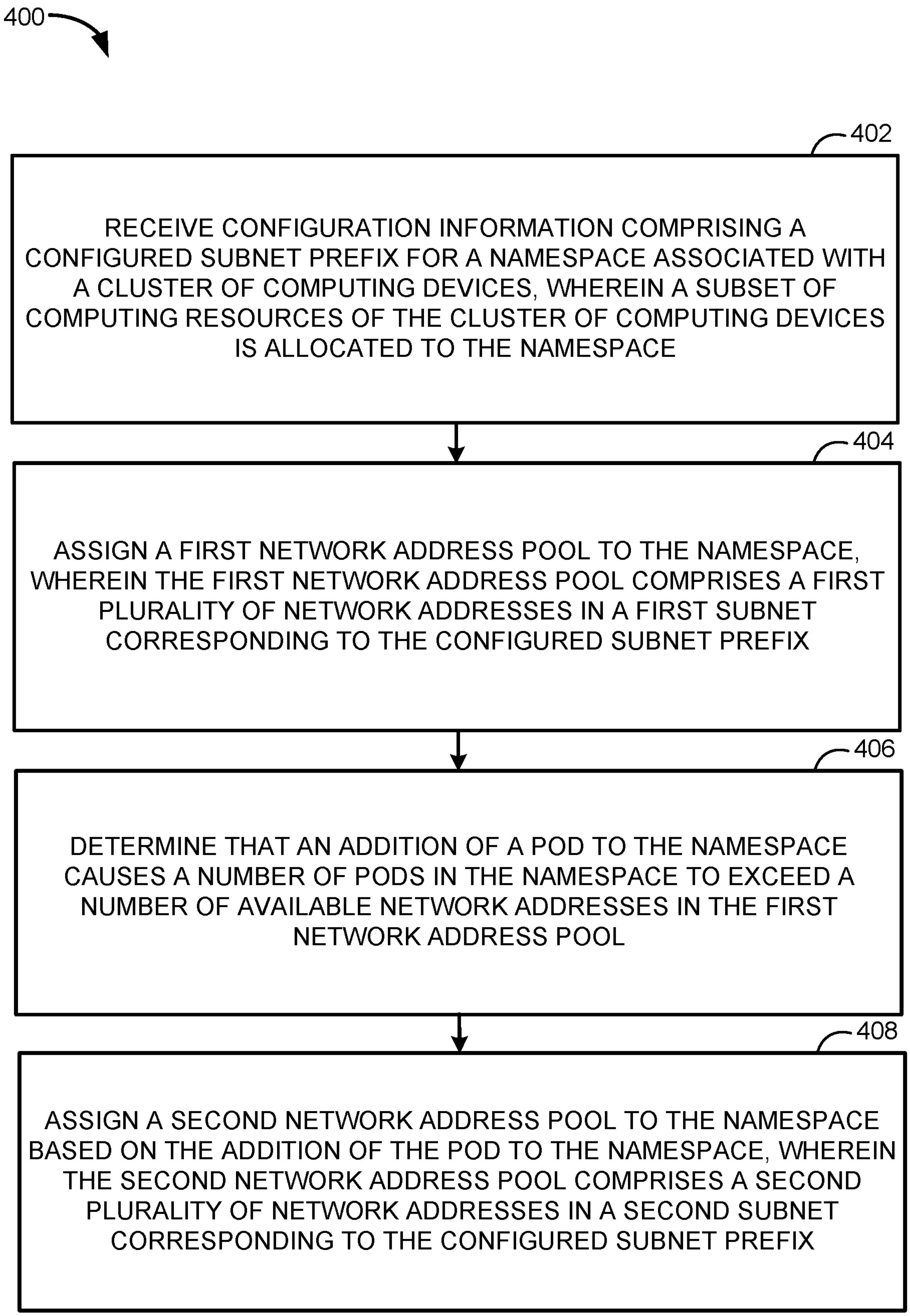

FIG. 4

DYNAMIC NETWORK ADDRESS MANAGEMENT

CROSS-REFERENCES

This application is a continuation of U.S. patent application Ser. No. 17/820,351 filed Aug. 17, 2022, entitled "DYNAMIC NETWORK ADDRESS MANAGEMENT", of which is an application that claims priority to CN Patent Application No. PCT/CN/2022/105928, filed Jul. 15, 2022, entitled "DYNAMIC NETWORK ADDRESS MANAGEMENT", the entirety of which both are incorporated herein by reference.

BACKGROUND

Network address management generally refers to techniques implemented in computer software for planning and managing the assignment and use of network addresses such as internet protocol (IP) addresses in a computer network. For example, in a virtualized computing environment, network address management may involve allocating network addresses for assignment to virtual computing instances (VCIs) running on one or more physical computing devices.

Certain existing techniques for network address management in virtualized computing environments involve allocating a fixed set of addresses to each node (e.g., physical or virtual computing device) on which VCIs run. However, such techniques may result in unnecessary allocation of network addresses that are not used and/or may result in delays in assigning network addresses (e.g., once allocated network addresses for a node have been exhausted).

As such, there is a need in the art for techniques that allow fine-grained, dynamic management of network addresses.

BRIEF DESCRIPTION OF THE DRAWINGS

FIG. 4 illustrates example operations for dynamic network address management according to embodiments of the present disclosure.

DETAILED DESCRIPTION

Figure 1A:
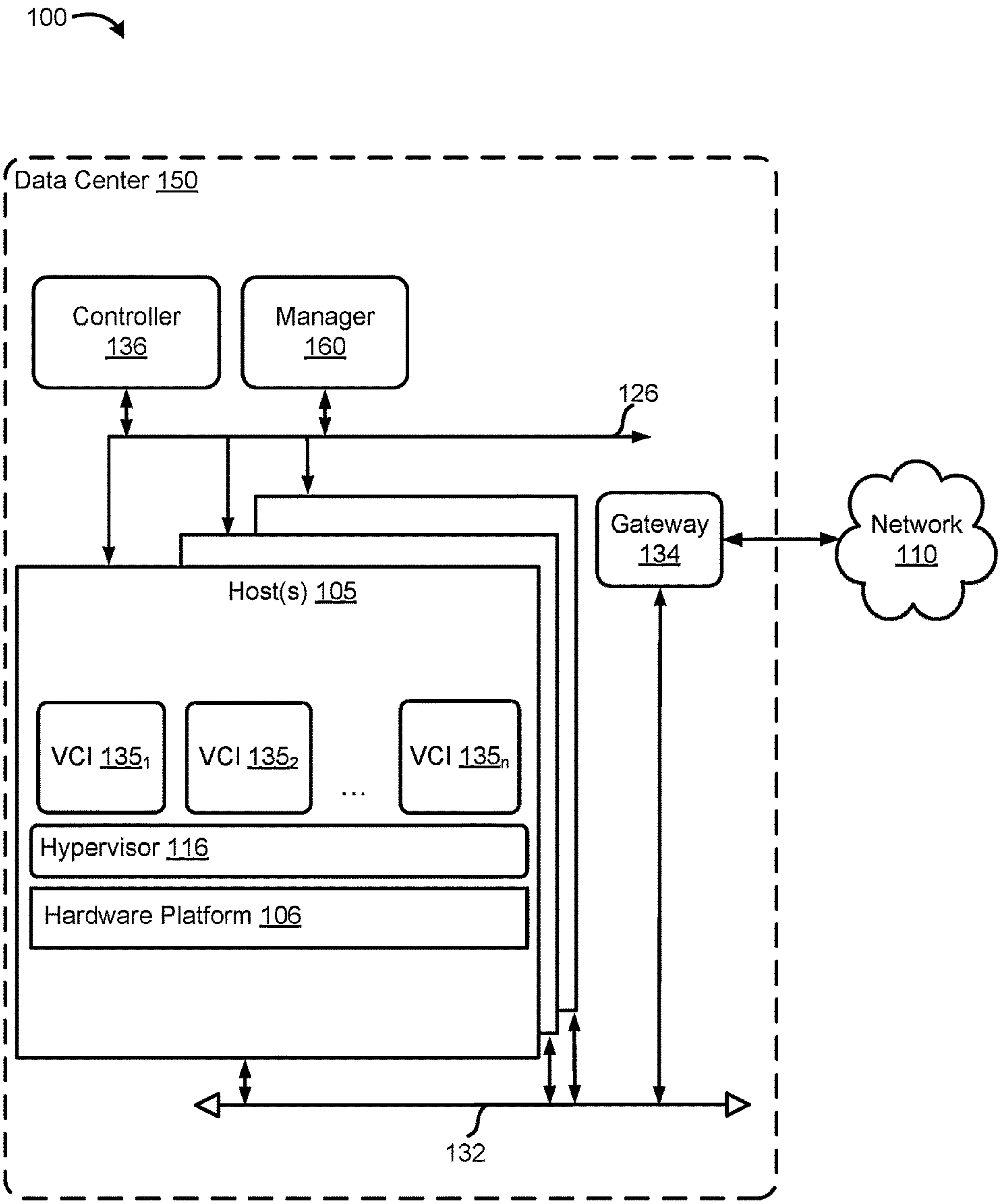
FIG. 1A and FIG. 1B are diagrams illustrating example computing components related to embodiments of the present disclosure.

Techniques described herein provide fine grained, dynamic network address management in virtualized computing environments.

A virtualized computing environment, as described in more detail below with respect to FIG. 1, involves multiple hosts in communication over a physical network infrastructure. Each host has one or more virtual computing instances (VCIs) such as virtual machines (VMs), containers, or the like. The term, "VCI" refers to any network-addressable endpoint that is not a physical computer or physical device and may be referred to herein as "virtualized endpoint" or "virtual endpoint." In some embodiments, VCIs may host other VCIs. For example, a container may reside on a VM. The VCIs can be connected to logical overlay networks. A logical overlay network, also referred to as a software-defined network (SDN) may span multiple physical hosts and is decoupled from the underlying physical network infrastructure using a tunneling/encapsulation technology. VCIs may be assigned network addresses such as internet protocol (IP) addresses to facilitate communications between the virtualized endpoints via the logical overlay network.

In a particular example, a platform as a service (PAAS) or container as a service (CAAS) infrastructure may be used, and may include containers that are created within various VCIs on a hypervisor. Platform as a service (PAAS) and container as a service (CAAS) solutions provide application level abstractions that allow developers to deploy, manage, and scale their applications, which are often deployed using multiple virtual machines and/or containers in tiered or microservices-based architectures. PAAS is a service that provides a platform that allows users to develop, run, and manage applications without the complexity of building and maintaining the infrastructure typically associated with launching an application. For example, a user can control software deployment with minimal configuration required, while the PAAS provides services to host the user's application. CAAS is a form of container-based virtualization provisioning in which container engines, orchestration, and the underlying compute resources are delivered to users as a service from a cloud provider. These solutions provide support for compute and storage but do not generally provide native networking support. As such, software defined networking (SDN) can be added using a plug-in component, to provide networking for the containers. For example, after a new container is scheduled for creation, an SDN control plane may generate network interface configuration data that can be used by the container's host VM (i.e., the VM hosting the container) to configure a network interface for the container. An example of this type of technology is described in U.S. Patent Application Publication 2022/0035651, published Feb. 3, 2022 and incorporated herein by reference. The configured network interface for the container enables network communication between the container and other network entities, including containers hosted by other VMs on the same or different hosts.

According to certain embodiments, a container-based computing platform is utilized in which containers are grouped into logical unit called "pods" that execute on nodes in a cluster (also referred to as "node cluster"). A node can be a physical computing device or a VM. In a typical deployment, a node includes an operating system (OS) and a container engine executing on top of the OS that supports the containers of pods in the node. Containers in the same pod share the same resources and the same network, and the containers in the same pod maintain a degree of isolation from containers in other pods. The pods may be distributed across nodes of the cluster.

In some embodiments, a service instance is implemented in the form of a pod that includes multiple containers, including a main container and one or more sidecar containers, which are responsible for supporting the main container. For instance, a main container may be a content server (i.e., the service being provided) and a sidecar container may perform logging functions for the content server, with the content server and the logging sidecar container each consuming resources from a common pool of resources such as storage associated with the pod. A cluster (e.g., including one or more service instances) may include one or more pods, individual containers, docker containers, VMs, and/or other VCIs.

In some cases, namespaces may be used to organize VCIs. For example, an administrator may define one or more "namespace" objects for which specific amounts of computing resources can be allocated (e.g., namespaces may be for different purposes, for use by different entities such as users, and/or the like). Namespaces, as used herein, are logical objects defined by software that provide resource-constrained and authorization-constrained units of multi-tenancy. An example of this type of namespace is a Kubernetes namespace. For example, in a computing environment with multiple tenants, a namespace provides resource constraints, user-access constraints, and policies (e.g., storage policies, network policies, etc.) that can be configured in a tenant-specific manner. Resource constraints can be expressed as quotas, limits, and the like with respect to compute (CPU and memory), storage, and networking of a virtualized infrastructure. User-access constraints include definitions of users, roles, permissions, bindings of roles to users, and the like. A user that has privileges with respect to a namespace that is configured for a host cluster is able to deploy VCIs and/or applications in the host cluster within the scope of the namespace.

In the context of a PAAS or CAAS system, namespaces may organize VCIs such as pods that are deployed in the cluster. For example, when multiple users utilize shared computing resources of a computing system, namespaces may be used to divide computing resources among the users (e.g., a user may only be able to utilize computing resources that are allocated to a namespace to which the user is assigned).

According to embodiments of the present disclosure, as described in more detail below with reference to FIGS. 2-4, network address pools are dynamically allocated to namespaces for use in assigning network addresses to VCIs within the namespaces, such as based on dynamic data about the state of the namespaces. For example, blocks of unallocated network addresses may be subdivided into smaller groups of network addresses referred to as network address pools, which may be dynamically allocated to namespaces or released from the namespaces as numbers of VCIs in the namespaces grow or shrink. In some embodiments, configuration information for a given namespace may specify a subnet prefix length, and network address pools allocated to the given namespace may comprise subnets that correspond to the specified subnet prefix length (e.g., the network address pools may be of a size that is determined based on the specified subnet prefix length). For example, if configuration information for a namespace specifies a subnet prefix length of "16", then a network address pool allocated to the given namespace may include all network addresses in the subnet 110.10.0.0/16 (this is included as one example of a subnet with the prefix length of 16). A subnet prefix length generally indicates a number of bits that are included in a subnet mask. The prefix (or network portion) of an IP address can be identified by a dotted-decimal netmask, commonly referred to as a subnet mask. For example, 255.255.255.0 indicates that the network portion (or prefix length) of the IP address is the leftmost 24 bits. The 255.255.255.0 subnet mask can also be written in Classless Inter-Domain Routing (CIDR) notation as/24, indicating that there are 24 bits in the prefix. A subnet with a CIDR prefix length of/24 (e.g., with a subnet mask of 255.255.255.0) includes a total of 255 possible addresses that could potentially be assigned to endpoints in the subnet (although there may be addresses reserved for certain purposes, such as a broadcast address). While examples described herein correspond to IPv4 addressing, the same approach can be applied to IPv6 addresses and other addressing schemes where a prefix or subset of address bits correspond to a subnet.

A user may configure a subnet prefix length for a namespace based on how many endpoints are expected to be added to the namespace. Network address pools allocated to the namespace may include any available subnets that correspond to the configured subnet prefix length.

Allocations of network address pools to namespaces may be stored in one or more configuration files, such as associated with a management component and/or located on one or more hosts.

Techniques described herein provide multiple improvements with respect to existing techniques for network address management. For example, by dynamically allocating network address pools to namespaces based on numbers of VCIs in the namespaces, embodiments of the present disclosure avoid allocating network addresses that are unlikely to be used (e.g., thereby improving availability of network addresses for entities that will use them) while ensuring that sufficient network addresses are allocated to suit the needs of a given entity. Furthermore, by allowing users to specify subnet prefix lengths for use in allocating network address pools to particular namespaces, techniques described herein provide more control to users over network address management at the namespace level.

Figure 1B:
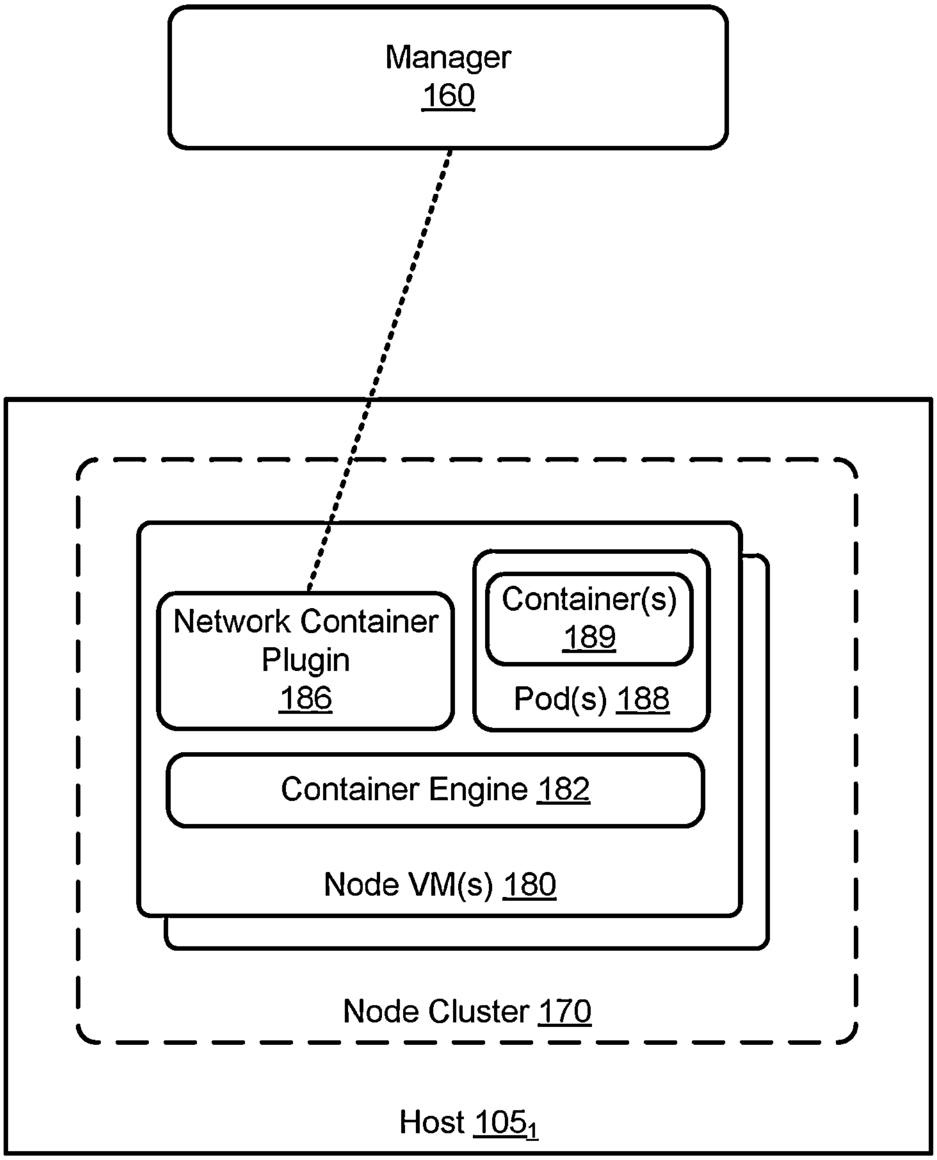

FIG. 1 illustrates example computing components related to embodiments of the present disclosure. FIG. 1 depicts a data center 150 that includes a host 105 and a manager 160.

Data center 150 generally represents a set of networked machines and may comprise a logical overlay network. In some embodiments, data center 150 is a software-defined data center (SDDC). Host 105 may be an examples of a machine in data center 150, and additional hosts (not shown) may also be included in data center 150, such as connected via one or more data and/or management networks. It is noted that, while not shown, additional networking environments such as data centers and/or clouds may also be connected to data center 150 via a network, such as the internet. Communication between different data centers and/or clouds may be performed via gateways or corresponding components associated with the different data centers and/or clouds.

Host 105 may include a server grade hardware platform 106, such as an x86 architecture platform. In example, host 105 may be a server that is geographically co-located with one or more other servers (e.g., other hosts of data center 150) on the same rack or on different racks. Host 105 is configured to provide a virtualization layer, also referred to as a hypervisor 116, that abstracts processor, memory, storage, and networking resources of hardware platform 106 for multiple virtual computing instances (VCIs) that run concurrently on the same host. VCIs may include, for instance, VMs, containers, pods, virtual appliances, and/or the like. For example, VCIs running on host 105 include one or more node VCIs 180 in a node cluster 170. Node VCI(s) 180 may be examples of machines. In some embodiments, a PAAS or CAAS infrastructure may be utilized within data center 150, such as including one or more clusters of VCIs (e.g., including node cluster 170), and one or more pods (e.g., pod(s) 188), containers (e.g., container(s) 189), and/or the like.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Manager 160 represents a management plane comprising one or more computing devices responsible for receiving logical network configuration inputs, such as from a network administrator, defining one or more endpoints (e.g., VMs, containers, and/or pods) and the connections between the endpoints, as well as rules governing communications between various endpoints. In one embodiment, manager 160 comprises one or more computer programs that execute in a central server of data center 150, or alternatively, may run in one or more VMs, e.g. in host 105. In certain embodiments, manager 160 is configured to receive inputs from an administrator or other entity, e.g., via a web interface or API, and carry out administrative tasks for data center 150, including centralized network management and providing an aggregated system view for a user. In some embodiments, manager 160 provides an interface to hardware platform 106, and is configured to carry out various tasks to manage virtual computing resources. For example, manager 160 may be able to deploy VCIs in data center 150 and/or perform other administrative tasks with respect to VCIs.

Node cluster 170 on host 105 comprises one or more node VCIs 180. In alternative embodiments, nodes in a cluster may comprise physical computing devices, such as hosts, rather than or in addition to virtual computing devices such as VCIs.

A given node VCI 180 comprises a container engine 182 that executes on top of an OS (not shown) of the node VCI 180 and supports the container(s) 189 of pod(s) 188 in the node VCI 180. Container engine 182 is responsible for loading container images (e.g., from a repository), monitoring local system resources, isolating system resources for use of a container, and managing lifecycles of containers. In some embodiments, container engine 182 ensures that all containers on the node VCI 180 are encapsulated by a pod 188.

A pod 188 is a group of one or more containers 189 with shared storage and network resources. A pod's contents are co-located (e.g., on the same node in the cluster), and run in a shared context. A pod functions as an application-specific "logical host," and generally contains one or more application containers that are relatively tightly coupled. A container management platform manages pods rather than managing containers directly. A pod can encapsulate an application composed of one container or multiple co-located containers that are tightly coupled and share resources. These co-located containers form a single cohesive unit of service, such as a "main" container serving data stored in a shared volume to the public and a separate "sidecar" container refreshing or updating those files. Generally, a pod wraps one or more containers, storage resources, and a network identity (e.g., a network address) together as a single unit. It is noted that while each pod is generally assigned a single network address, there may be certain implementations in which multiple interfaces are configured for a single pod, and multiple network addresses may be assigned to that single pod. Thus, each pod in a namespace may potentially be assigned one or more network addresses from a network address pool allocated to the namespace.

Network container plugin (NCP) 186 runs within node cluster 170 (e.g., on a single node VCI 180 or in a distributed manner across multiple node VCIs 180). For example, NCP 186 may communicate with manager 160, such as receiving configuration information from manager 160 that indicates configurations of one or more namespaces and pods within those namespaces.

NCP 186 provides network functionality for pod(s) 188, including performing dynamic network address management as described herein. For example, NCP 186 may automatically create a logical network topology for node cluster 170 including a separate logical network for each namespace associated with the cluster. NCP 186 connects pod(s) 188 to the logical network, and allocates IP and MAC addresses to pod(s) 188. NCP 186 also supports network address translation (NAT), such as allocating a separate SNAT IP address for each namespace.

As described in more detail below with respect to FIGS. 2-4, NCP 186 allocates network address pools to namespaces within a cluster such as node cluster 170, such as based on configured subnet prefix lengths for the namespaces, in a dynamic fashion based on numbers of VCIs, such as pod(s) 188, in the namespaces.

Figure 2:
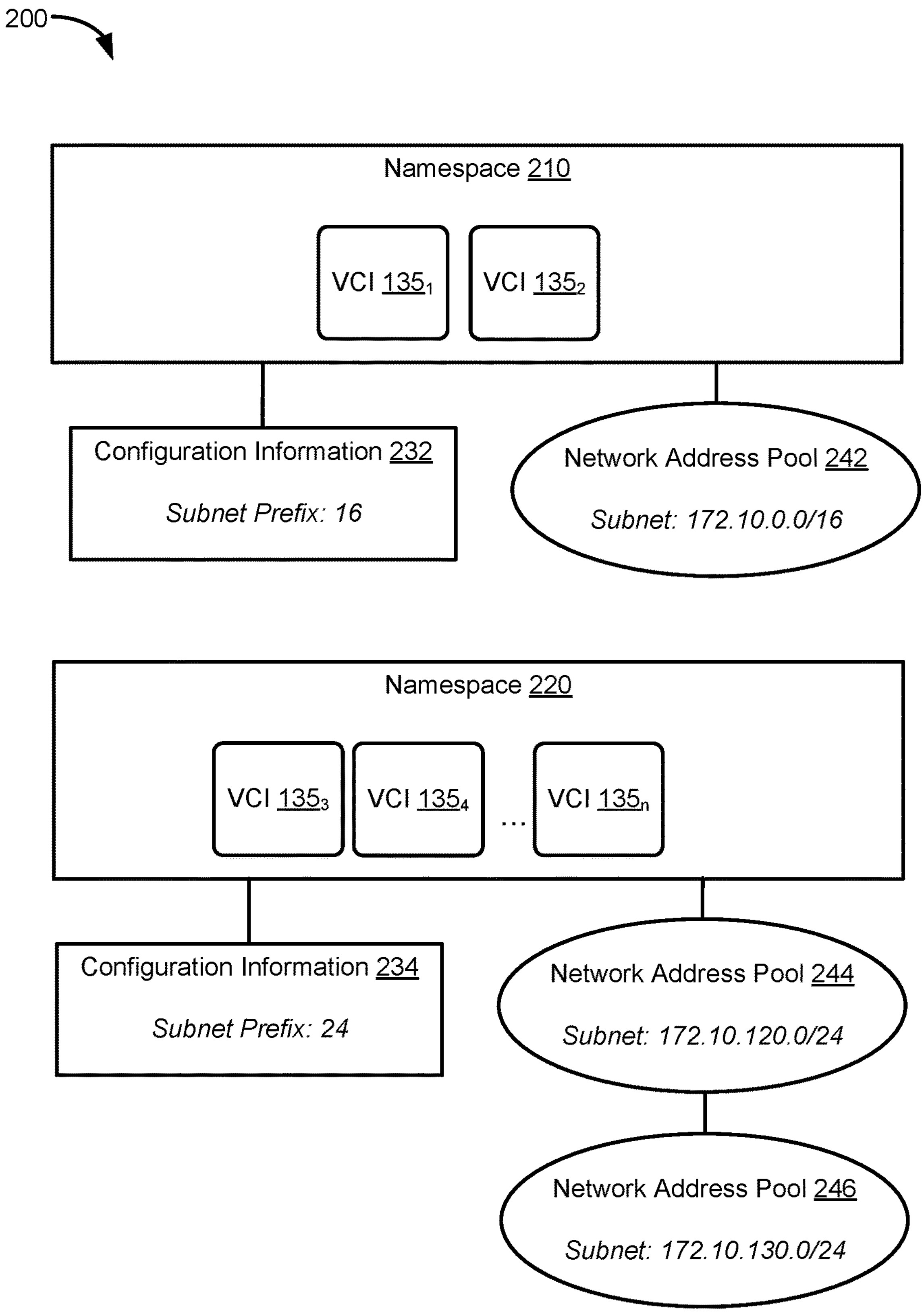
FIG. 2 is a diagram illustrating an example related to dynamic network address management.

FIG. 2 shows a networking environment 200 that includes dynamic network address management. Network environment 200 includes pods 188 of FIG. 1. Two namespaces 210 and 220 have been configured within networking environment 200, such as cluster 170 (FIG. 1). For example, a user may have defined namespaces 210 and 220 via manager 160 (FIG. 1). As previously described, namespaces are a way to organize VCIs (e.g., pods 188), such as organizing clusters into virtual sub-clusters. For example, namespaces can be useful when different teams or projects share a cluster. Namespaces within a cluster are logically separated from one other (e.g., meaning that VCIs in one namespace utilize computing resources allocated to that namespace and are logically separated from VCIs in another namespace) while VCIs within the namespaces have the ability to communicate with each other. Generally, namespaces cannot be nested within each other.

Namespaces 210 and 220 are associated with, respectively, configuration information 232 and 234 defining subnet prefix lengths for the namespaces. For example, configuration information 232 and 234 may have been defined via manager 160 of FIG. 1 or via a management component associated with a node cluster, such as by an administrator. Configuration information 232 indicates a subnet prefix length of "16" for namespace 210, and configuration information 234 indicates a subnet prefix length of "24" for namespace 220. In one example, an administrator defines configuration information 232 and 234 by adding, for each respective namespace, an annotation (e.g., "ncp/subnets") in a configuration file for the respective namespace, such as a YAML (YAML Ain't Markup Language) file. For instance, "ncp/subnets" may include a list of one or more subnet prefixes and/or prefix lengths to be used for the respective namespace. In some embodiments, one or more default subnet prefixes and/or prefix lengths may be used if there is no subnet prefix or prefix length specified by the user in configuration information for a given namespace, or the user may select to use one or more default subnet prefixes and/or prefix lengths.

According to certain embodiments, network address pools 242 and 244 are allocated to namespaces 210 and 220, respectively (e.g., after namespaces 210 and 220 are initially created), such as by NCP 186 of FIG. 1. For example, a network address pool may be assigned to each namespace upon the creation of the namespace (e.g., regardless of whether there any VCIs in the namespace), and additional network address pools may be dynamically allocated to and/or released from the namespace as the number of VCIs in the namespace grows and/or shrinks.

Network address pool 242 comprises the subnet "172.10.0.0/16", which corresponds to the subnet prefix length "16" defined in configuration information 232. For example, the subnet prefix length may be a Classless Inter-Domain Routing (CIDR) prefix length, and a size of network address pool 242 may be determined based on the subnet prefix length, as is known in the art. The same may be true of other subnet prefix lengths and network address pools that are described herein. A subnet mask corresponding to the subnet prefix length "16" may be 255.255.0.0, and so there may be a total of 2552 separate network addresses in network address pool 242 that can be assigned to endpoints (e.g., one or more of these addresses may be reserved for specific purposes such as a broadcast address).

Pods $188_1$ and $188_2$ are added to namespace 210, and are assigned network addresses from network address pool 242. For example, pod $188_1$ may be assigned an IP address of 172.10.1.1 and pod $188_2$ may be assigned an IP address of 172.10.1.2. No additional network address pools need to be allocated yet to namespace 210, since the number of network addresses required for the pods in namespace 210 has not exceeded the number of available network addresses in network address pool 242.

Network address pool 244 comprises the subnet "172.10.120.0/24", which corresponds to the subnet prefix length "24" defined in configuration information 234. A subnet mask corresponding to the subnet prefix length "24" may be 255.255.255.0, and so there may be a total of 255 separate network addresses in network address pool 244 that can potentially be assigned to endpoints. Pods $188_{3-n}$ are added to namespace 220. The pods in namespaces 220 are assigned network addresses from network address pool 244 until all available network addresses in network address pool 244 have been assigned. For example, pods $188_{3-x}$ may be assigned network addresses from network address pool 244 where x−3 is equal to the number of available network addresses in network address pool. Once the first pod is added to namespace 220 after the available network addresses in network address pool 244 have already been assigned (e.g., when pod $188_{x+1}$ is added to namespace 220), an additional network address pool 246 is dynamically allocated to namespace 220.

Network address pool 246 comprises the subnet "172.10.130.0/24", which corresponds to the subnet prefix length "24" defined in configuration information 234. Allocating network addresses in pools having sizes corresponding to the configured prefix length, rather than pools of a static size or a randomly chosen size, allows a user to exercise greater control over network address management. Pods added to namespace 220 after the available network addresses in network address pool 244 have already been assigned (e.g., when network address pool 244 has been exhausted by VCIs in namespace 220) are assigned network addresses from network address pool 246 (e.g., until the available network addresses in network address pool 246 are also exhausted). For example, pods $188_{(x+1)-n}$ may be assigned network addresses from network address pool 246.

Dynamic network address management techniques described herein may be performed by a network container plugin (NCP) (e.g., NCP 186 of FIG. 1) in communication with manager 160 (FIG. 1). The NCP may determine dynamic data about creation/deletion of namespaces and addition/removal of VCIs from namespaces may be determined through interaction with one or more components such as manager 160 of FIG. 1 (e.g., which is involved in creation/deletion of namespaces and addition/removal of VCIs from namespaces, and therefore knows this information).

Figure 3:
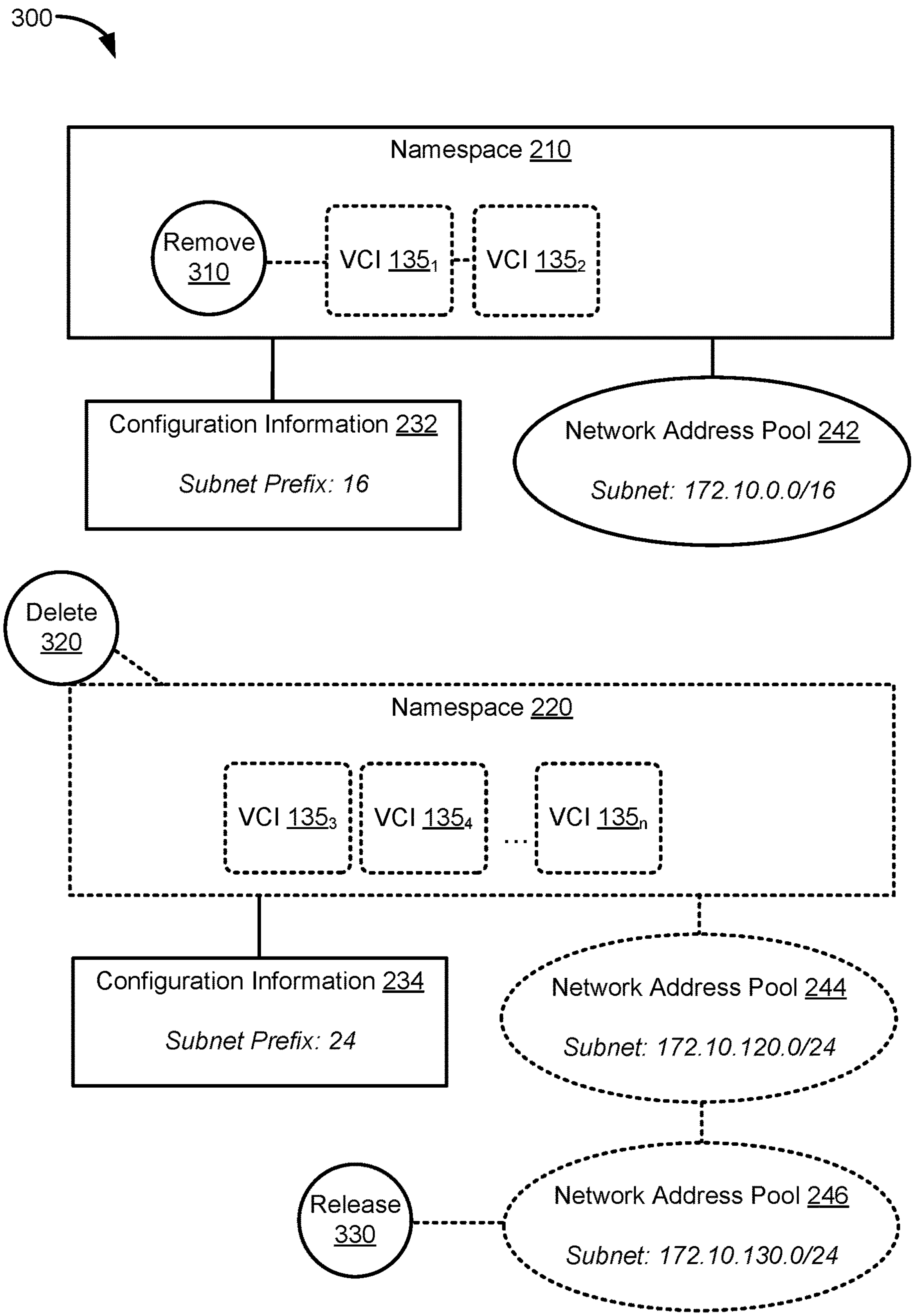
FIG. 3 is a diagram illustrating an additional example related to dynamic network address management.

FIG. 3 shows another example related to dynamic network address management in the context of network environment 200. In FIG. 3, a removal 310 is performed in which pods $188_1$ and $188_2$ are removed from namespace 210. For example, pods $188_1$ and $188_2$ may be moved out of namespace 210 or may be deleted altogether. Network addresses from network address pool 242 that were assigned to pods $188_1$ and $188_2$ are released back to network address pool 242. However, network address pool 242 remains allocated to namespace 210. For example, it may be advantageous to keep one network address pool allocated to a namespace even when there are no pods in the namespace to ensure that network addresses will be available when pods are added to the namespace (e.g., if the namespace has not been deleted, it may be assumed that pods will be added to the namespace). Furthermore, keeping one network address pool allocated to each namespace regardless of whether the namespace includes any pods reduces the time for deploying a new pod in the namespace, as there will be fewer creations and deletions of network address pools.

A deletion 320 is also performed, in which namespace 220 is deleted. pods $188_{3-n}$ may be moved out of namespace 220 and/or may be deleted altogether. In response to deletion 320, network address pools 244 and 246 are both released from namespace 220. In other words, pools 244 and 246 are deleted along with namespace 220, which releases the addresses within those pools so that they are available to be reused by other entities, such as new address pools that are created for other namespaces. It is noted that if namespace 220 had not been deleted and if the number of pods in namespace 220 had reduced such that no network addresses in network address pool 246 were being utilized (e.g., if all pods that had previously been assigned network addresses from network address pool 246 were removed from namespace 220), then network address pool 246 would have been released (see "Release 330" in FIG. 3) from namespace 220 while network address pool 244 would have remained allocated to namespace 220. However, because namespace 220 was deleted altogether, all network address pools allocated to namespace 220 are released.

Releasing a network address pool from a namespace generally involves de-allocating the network address pool from the namespace such that network addresses in the network address pool become available to be used by entities outside of the namespace (e.g., by entities in other namespaces that are also configured to use the same subnet prefix length as the released network address pool).

In some embodiments, a user may change configuration information for a given namespace to define one or more different subnet prefix lengths and/or to remove one or more subnet prefix lengths. If the user replaces an old subnet prefix length with a new subnet prefix length for a particular namespace, a new network address pool corresponding to the new subnet prefix length may be allocated to the namespace (e.g., when all existing network address pools have been allocated to the namespace have been exhausted), and VCIs subsequently added to the namespace may be assigned network addresses from the new network address pool. It may be advantageous not to change network addresses of existing VCIs so as to avoid disruption. Thus, network address management may be dynamically updated over time based on new configuration information provided by users of the networking environment.

Techniques described herein provide improved efficiency compared to existing network address management techniques. For example, embodiments of the present disclosure involve limiting allocation of network address pools to namespaces to situations where the network address pools are likely to be used by the namespaces (e.g., keeping one network address pool allocated for each namespace even when the namespace has no VCIs, as with namespace 210 in illustration 300). Furthermore, embodiments of the present disclosure involve dynamically releasing network address pools for use by entities outside of the namespaces when the network address pools are no longer needed by the namespaces (e.g., when a number of VCIs in a namespace shrinks or when the namespace is deleted, as with namespace 220 in illustration 300). Furthermore, techniques described herein provide enhanced user control over network address management by allowing a user to define subnet prefix lengths for namespaces (e.g., via configuration information 232 and 234), thereby also specifying the sizes of subnets allocated to the namespace.

It is noted that while certain embodiments are described herein with respect to PAAS and CAAS frameworks, such as involving clusters, pods, and namespaces, techniques described herein may be utilized to provide dynamic network address management for other types of network entities, such as other types of VCIs or endpoints reachable via one or more logical and/or physical networks. Thus, certain examples described herein are not to be construed as limiting.

FIG. 4 shows a flowchart 400 illustrating by way of example a method for dynamic network address management, according to an example embodiment of the present application. Operations 400 may be performed, for example, by one or more components of data center 150 of FIG. 1, such as manager 160 and/or a network container plugin (NCP) 186 associated with manager 160.

Flowchart 400 begins at step 402, with determining a creation of a namespace associated with a cluster of computing devices, wherein a subset of computing resources of the cluster of computing devices is allocated to the namespace.

Flowchart 400 continues at step 404, with assigning, to the namespace, a network address pool comprising a plurality of network addresses in a subnet, wherein the assigning causes the plurality of network addresses to be reserved exclusively for the namespace. In some embodiments, the subnet is determined based on a configured subnet prefix length that is specified in configuration information for the namespace.

Flowchart 400 continues at step 406, with receiving an indication that a pod is added to the namespace. For example, the pod added to the namespace may comprise one or more containers supported by a container engine.

Flowchart 400 continues at step 408, with, in response to the receiving of the indication, assigning a network address from the network address pool to the pod.

Some embodiments further comprise determining that an addition of a new pod to the namespace causes a required number of network addresses for the namespace to exceed a number of available network addresses in the network address pool. For example, certain embodiments further comprise assigning an additional network address pool to the namespace based on the addition of the new pod to the namespace, wherein the additional network address pool comprises an additional plurality of network addresses in an additional subnet.

Some embodiments further comprise determining, based on a removal of a given pod from the namespace, that no network addresses in the additional network address pool are in use by the namespace, and releasing the additional network address pool from the namespace.

Certain embodiments further comprise determining a creation of a new namespace associated with the cluster of computing devices, wherein a different subset of the computing resources of the cluster of computing devices is allocated to the new namespace, and assigning a different network address pool to the new namespace, wherein the different network address pool comprises a different plurality of network addresses in a different subnet. Some embodiments further comprise releasing the different network address pool from the new namespace based on determining that the new namespace has been deleted.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

The invention claimed is:

1. A method, comprising:
- determining a creation of a namespace associated with a cluster of virtual computing instances (VCIs), each of the VCIs comprising a pod, each pod comprising one or more containers, the namespace having associated therewith a subset of computing resources of the cluster of VCIs;
- determining, by a network container plugin (NCP), a size of a first network address pool to allocate to the namespace based on a first specified subset prefix length specified in configuration information for the namespace, the network address pool comprising a plurality of network addresses in a subnet;
- reserving, by the NCP, the plurality of network addresses in the subnet exclusively for the namespace by allocating the first network address pool to the namespace;
- receiving an indication that a pod is added to the namespace; and
- in response to the receiving of the indication, assigning a network address from the first network address pool to the pod.

2. The method of claim 1, further comprising: determining that an addition of a new pod to the namespace causes a required number of network addresses for the namespace to exceed a number of available network addresses in the network address pool; and assigning an additional network address pool to the namespace based on the addition of the new pod to the namespace, wherein the additional network address pool comprises an additional plurality of network addresses in an additional subnet.

3. The method of claim 2, further comprising: determining, based on a removal of a given pod from the namespace, that no network addresses in the additional network address pool are in use by the namespace; and releasing the additional network address pool from the namespace.

4. The method of claim 1, further comprising: determining a creation of a new namespace associated with the cluster of computing devices, wherein a different subset of the computing resources of the cluster of computing devices is allocated to the new namespace; and assigning a different network address pool to the new namespace, wherein the different network address pool comprises a different plurality of network addresses in a different subnet.

5. The method of claim 4, further comprising releasing the different network address pool from the new namespace based on determining that the new namespace has been deleted.

6. The method of claim 1, wherein the pod added to the namespace comprises one or more containers supported by a container engine.

7. A system for network address management, the system comprising:
- at least one processor; and
- at least one non-transitory computer-readable medium storing instructions that, when executed by the at least one processor, cause the at least one processor to perform operations comprising:
  - determining a creation of a namespace associated with a cluster of virtual computing instances (VCIs), each of the VCIs comprising a pod, each pod comprising one or more containers, the namespace having associated therewith a subset of computing resources of the cluster of VCIs;
  - determining, by a network container plugin (NCP), a size of a first network address pool to allocate to the namespace based on a first specified subset prefix length specified in configuration information for the namespace, the network address pool comprising a plurality of network addresses in a subnet;
  - reserving, by the NCP, the plurality of network addresses in the subnet exclusively for the namespace by allocating the first network address pool to the namespace;
  - receiving an indication that a pod is added to the namespace; and
  - in response to the receiving of the indication, assigning a network address from the first network address pool to the pod.

8. The system of claim 7, wherein the operations further comprise:
- determining that an addition of a new pod to the namespace causes a required number of network addresses for the namespace to exceed a number of available network addresses in the network address pool; and assigning an additional network address pool to the namespace based on the addition of the new pod to the namespace, wherein the additional network address pool comprises an additional plurality of network addresses in an additional subnet.

9. The system of claim 8, wherein the instructions further comprise:
- determining, based on a removal of a given pod from the namespace, that no network addresses in the additional network address pool are in use by the namespace; and
- releasing the additional network address pool from the namespace.

10. The system of claim 7, wherein the operations further comprise:

determining a creation of a new namespace associated with the cluster of computing devices, wherein a different subset of the computing resources of the cluster of computing devices is allocated to the new namespace; and assigning a different network address pool to the new namespace, wherein the different network address pool comprises a different plurality of network addresses in a different subnet.

11. The system of claim 10, wherein the operations further comprise:

releasing the different network address pool from the new namespace based on determining that the new namespace has been deleted.

12. The system of claim 7, wherein the pod added to the namespace comprises one or more containers supported by a container engine.

13. A non-transitory computer-readable medium storing instructions that, when executed by one or more processors, cause the one or more processors to perform operations comprising:

determining a creation of a namespace associated with a cluster of virtual computing instances (VCIs), each of the VCIs comprising a pod, each pod comprising one or more containers, the namespace having associated therewith a subset of computing resources of the cluster of VCIs;

determining, by a network container plugin (NCP), a size of a first network address pool to allocate to the namespace based on a first specified subset prefix length specified in configuration information for the namespace, the network address pool comprising a plurality of network addresses in a subnet;

reserving, by the NCP, the plurality of network addresses in the subnet exclusively for the namespace by allocating the first network address pool to the namespace;

receiving an indication that a pod is added to the namespace; and in response to the receiving of the indication, assigning a network address from the first network address pool to the pod.

14. The non-transitory computer-readable medium of claim 13, wherein the operations further comprise: determining that an addition of a new pod to the namespace causes a required number of network addresses for the namespace to exceed a number of available network addresses in the network address pool; and assigning an additional network address pool to the namespace based on the addition of the new pod to the namespace, wherein the additional network address pool comprises an additional plurality of network addresses in an additional subnet.

15. The non-transitory computer-readable medium of claim 14, wherein the operations further comprise: determining, based on a removal of a given pod from the namespace, that no network addresses in the additional network address pool are in use by the namespace; and releasing the additional network address pool from the namespace.

16. The non-transitory computer-readable medium of claim 14, wherein a size of the additional network address pool is determined based on the first specified subset prefix length.

17. The non-transitory computer-readable medium of claim 13, wherein the operations further comprise: determining a creation of a new namespace associated with the cluster of computing devices, wherein a different subset of the computing resources of the cluster of computing devices is allocated to the new namespace; and assigning a different network address pool to the new namespace, wherein the different network address pool comprises a different plurality of network addresses in a different subnet.

18. The non-transitory computer-readable medium of claim 17, wherein the operations further comprise: releasing the different network address pool from the new namespace based on determining that the new namespace has been deleted.

19. The non-transitory computer-readable medium of claim 13, wherein the pod added to the namespace comprises one or more containers supported by a container engine.

20. The non-transitory computer-readable medium of claim 13, wherein the NCP communicates with a management component to receive configuration information indicating configurations of one or more namespaces and pods within the one or more namespaces.

* * * * *